United States Patent [19]

Radel

[11] Patent Number: 4,932,992

[45] Date of Patent: Jun. 12, 1990

[54] DUAL PURPOSE UREASE AND NITRIFICATION INHIBITORS

[75] Inventor: Robert J. Radel, Florence, Ala.

[73] Assignee: Tennessee Valley Authority, Muscle Shoals, Ala.

[21] Appl. No.: 266,963

[22] Filed: Nov. 3, 1988

[51] Int. Cl.$^5$ ................................................ C05G 3/08
[52] U.S. Cl. ........................................ 71/29; 71/902; 71/27; 71/61
[58] Field of Search .................... 71/1, 11, 27, 29, 902

[56] References Cited

U.S. PATENT DOCUMENTS

H25 2/1986 Radel ................................ 71/28 X

Primary Examiner—Ferris H. Lander
Attorney, Agent, or Firm—Robert A. Petrusek

[57] ABSTRACT

The first embodiment of the present invention relates to my discovery that thiophosphoryl triamide can be utilized as a nitrification inhibitor for controlling the nitrification of ammonium to nitrate. The second embodiment relates to my discovery that this same compound can be used to control, within predetermined limits, the ammonium/nitrate ratios in urea-based fertilizers, by serving as a dual-purpose inhibitor to control both urease inhibition and nitrification inhibition and thereby maximize plant response characteristics in direct proportion to nutrient value amendments to the soil environment.

3 Claims, 5 Drawing Sheets

DUAL PURPOSE UREASE AND NITRIFICATION INHIBITORS

The invention herein described may be manufactured and used by or for the Government for governmental purposes with the payment to me of any royalty therefor.

INTRODUCTION

Loss of fertilizer nitrogen from agricultural cropland is worldwide problem. Of the three primary plant nutrients (nitrogen, phosphorus, and potassium), nitrogen is used in the largest quantities and with the least efficiency. It is estimated that worldwide only about 40 percent of the applied fertilizer nitrogen is recovered by crops (G. Cooke, "Constraints to Crop Production—Opportunities for the Chemical Industry," seminar presented at the International Fertilizer Development Center, Mar. 9, 1984). This loss of fertilizer nitrogen represents both an economic loss and pollution source. In the U.S. alone, it is estimated that the annual loss of fertilizer nitrogen represents an economic loss of 700 million dollars [J. Gautney, Y. K. Kim, and P. M. Gagen, *I&EC Chem. Prod. Res. Dev.* 23(3), 483–489 (1984)], and nitrate pollution of groundwater from the agricultural usage of fertilizer is an area of growing concern. L. W. Cantor [*Ground Water Quality and Agricultural Practices*, (D. M. Fairchild, ed.), Lewis Publishers, Inc., Chelsea, Mich., 153–174 (1987)] recently conducted a literature survey to determine the extent of nitrates in groundwater and concluded that nitrate pollution of groundwater from agricultural applications of fertilizers is a widespread problem in the U.S.

About half of the nitrogen not utilized by crops is immobilized as soil inorganic nitrogen; the other half is lost via one or both of two quite different reaction sequences which occur after nitrogen containing fertilizer is added to the soil.

The first sequence of reactions, which occurs with urea-based fertilizers, is the urease catalyzed hydrolysis of urea to ammonia according to the following overall reaction:

(1)

The ammonia produced supra reacts with soil water to set up the following equilibrium:

(2)

Reaction (1) supra serves a vital function in providing inorganic nitrogen for growing plants. However, the urease-induced hydrolysis of urea is very rapid, and this can cause a buildup of free ammonia in the soil microsite around the fertilizer. As a result, considerable loss of ammonia by volatilization often occurs. Loss of ammonia is especially a problem when urea fertilizers are surface-applied to agricultural soils [D. W. Nelson, "Nitrogen in Agricultural Soils," *Am. Soc. Agron.*, Madison, Wis., 327–358 (1982)]. Most of ammonia volatilization from urea occurs in the first week after application. Moderate delays in urea hydrolysis during this time period can greatly reduce ammonia volatilization losses for several reasons. For instance, the farmer has more time to incorporate urea beneath the soil surface before such ammonia losses occur. There is a greater probability of receiving rain with resulting incipient percolation of fertilizer nitrogen values into the soil before such ammonia losses occur.

The second reaction sequence, which results with ammonia-based fertilizers such as ammonium nitrate, and ultimately, with urea-based fertilizers after they are converted to ammonium forms by reactions (1) and (2) above, is the biological oxidation of ammonium to nitrite and nitrate by nitrosomonas and nitrobacter bacteria. For the sake of convenience, cations such as ammonium, and anions such as nitrite and nitrate, will hereinafter oftentimes simply be referred to as ammonium, or nitrite and nitrate.

(3)

The process supra, known as nitrification, leads to nitrogen losses by leaching and denitrification. The leaching losses occur because the negatively charged nitrite and nitrate anions are very mobile, i.e., moving down through the soil profile with water. As a result, the nitrogen is leached below the root zone where it becomes physically inaccessible to the plant and oftentimes results in pollution of groundwater. In contrast, the positively charged ammonium cation is relatively immobile because it is attracted and held in the root zone by negatively charged soil particles. The denitrification losses result from biological reduction of nitrite and nitrate to gaseous nitrogen forms, i.e., $NO_x$ and $N_2$, which are lost to the atmosphere. In the United States it has been reported that approximately 25 percent of the applied fertilizer nitrogen is lost by leaching and denitrification [(E. C. Varsa and D. M. Huber, *Solutions*, Feb. 1983, 60–64) and (D. M. Huber, *Solutions*, 86–90, Mar.-/Apr. 1980)].

Recently, the more complex issue of providing the proper balance of ammonium and nitrate forms of fertilizer nitrogen has received considerable attention [B. R. Bock, "Increasing Cereal Yields With Higher Ammonium/Nitrate Ratios: Review of Potentials and Limitations," *J. Environ. Sci. Health*, A21:723–758 (1986)]. Several nitrogen fertilizer management variables can be manipulated to control ammonium/nitrate ratios. These include nitrogen fertilizer source (initial ammonium/nitrate ratio of the nitrogen fertilizer), type and rate of nitrification inhibitor, and the timing of nitrogen fertilizer source-nitrification inhibitor application.

Controlling ammonium/nitrate ratios early in the growing season generally can be achieved with a preplant application of a nitrogen fertilizer source with the desired ammonium/nitrate ratio plus a nitrification inhibitor. With preplant application, nitrification inhibitors now in use will usually control nitrification, at least through the lag phase of nitrogen fertilizer uptake by the crop. Longer control of ammonium/nitrate ratios generally require more intensive and costly management of nitrogen fertilizer sources and nitrification inhibitors.

Control of ammonium/nitrate ratios later in the growing season will require either a more persistent nitrification inhibitor than that which is currently in use or later application of the ammonium source and inhibitor. There have been a few studies of sidedressed anhydrous ammonia with nitrapyrin for corn, but measurements of soil ammonium/nitrate ratios resulting from this practice have not been found in the literature. Such sidedress applications would require additional trips over the field, thus increasing labor, fuel, and energy costs.

Incremental application of nitrogen fertilizer and nitrification inhibitor should provide significant advantages for controlling ammonium/nitrate ratios in soil. These incremental applications would, of course, require additional trips over the field and would accordingly substantially increase fuel and energy costs. Another approach for achieving relatively long-term control of ammonium/nitrate ratios is to use a slow-release source of ammonium and nitrification inhibitor. Little work, however, has been done in this area.

Most of the work completed to date has centered on the use of known nitrification inhibitors for delaying nitrification of ammonium to nitrate, thus controlling the ammonium/nitrate ratio. This work has been reviewed by Bock (ibid.). There are no reports in the literature of dual purpose urease/nitrification inhibitors being used for the purpose of controlling ammonium/nitrate nutrition ratios.

From the above description, it is obvious that the efficiency of nitrogen fertilizers can be increased and the potential for nitrogen pollution reduced by delaying the urease catalyzed hydrolysis of urea and/or the nitrification of ammonium nitrogen. Substances which delay reactions (1) and (3) supra are known as urease inhibitors and nitrification inhibitors, respectively.

Similarly, from the above discussion, it now can be appreciated that controlling ammonium/nitrate nutrition may require both urease inhibitors (to control the ammonium levels and prevent ammonia toxicity) and nitrification inhibitors (to extend the availability of ammonium in the soil) and more preferably a compound or substance which will perform both roles. Substances which perform both roles belong to a newly defined class of compounds herein referred to and subsequently known as ammonium/nitrate nutrition control agents or dual purpose urease/nitrification inhibitors.

BACKGROUND OF THE INVENTION

1. Field of the Invention

Embodiment 1: The concept underlying the gist of embodiment 1 of the instant invention is based on the unexpected discovery that thiophosphoryl triamide, which has been previously recognized as a urease inhibitor (U.S. SIR H25, Radel, Feb. 4, 1986; U.S. Pat. No. 4,676,822, Gautney, Jun. 30, 1987), is also capable of inhibiting nitrification of ammonium to nitrate in soil systems.

Embodiment 2: The concept underlying the gist of embodiment 2 of the instant invention is based on the unexpected discovery that this inhibitor can be used to control the concentration of ammonium in urea-containing fertilizers by effectively maintaining low levels of ammonium during early stages of plant seedling development via its urease inhibitory characteristics and by effectively maintaining high levels of ammonium nitrogen in the soil system during the later stages of plant reproductive growth.

2. Description of Prior Art

Embodiment 1: Several hundred scientific papers have been published on urease since Sumner (1926) first produced the classical octahedral crystals and showed that the enzyme was a protein. However, it was not until 1969 that Zerner's group [R. L. Blakeley, E. C. Webb, and B. Zerner, Biochemistry 8, 1984–1990 (1969)] prepared a highly purified urease with a full specific activity and in at least a 99 percent homogeneous state. They established with this preparation a reproducible molecular weight (about 590,000) and proposed that the molecule contained six subunits with asparagine as the N-terminal amino acid. Although previous work [J. F. Ambrose, G. B. Kistiakowsky, and A. G. Kridl, J. Am. Chem. Soc. 73, 1232 (1951)] had indicated that four or eight essential SH-groups were involved in the urea-hydrolysis reaction, Zerner's group could only confirm that the active site SH-groups "react slowly with N-ethylmaleimide," but they were unable to define unequivocally the number of "essential SH-groups" in the 590,000 molecular weight species. In addition, Kobashi et al. [K. Kobashi, J. Hase, and T. Komai, Biochem. Biophys. Res. Commun. 23, 34 (1966)], on the basis of inhibition by hydroxamic acids, suggested that the number of active sites in the 590,00 molecular weight species of sword bean urease was two. These results seem to be confirmed by the discovery that highly purified urease from jack bean [N. E. Dixon, C. Gazzola, R. L. Blakeley, and B. Zerner, J. Am. Chem. Soc. 97, 4131 (1975)] and from tobacco, rice, and soybean [J. C. Polacco, Plant Science Letters 10, 249–255 (1977)] contained stoichiometric amounts of nickel (two atoms per active site), demonstrating simultaneously the first biological role definitely assigned to nickel. Over the last few years, considerable effort has been made to determine the mechanism of the urease reaction. Elucidation of the mechanism of the urease reaction is complicated because the enzyme has a tendency to form polymers and isozymes changing the properties of the original monomeric enzyme and probably the mechanism of reaction [W. N. Fishbein and K. Nagarajan, Arch. Biochem. Biophys. 144, 700–714 (1971)]. In addition, the properties of soil urease differ significantly from those of ureases from other sources [J. M. Bremner and R. L. Mulvaney, Soil Enzymes, R. G. Burns, ed., Academic Press, 149–196 (1978)]; and it is much more difficult to obtain reliable kinetic data for enzymes in heterogeneous environments, such as soil, than for enzymes in homogeneous solutions. As a result most attempts to determine the mechanism of urease inhibition have been confined to non-soil systems. Attempts to demonstrate the formation of a carbamoyl-enzyme intermediate, which was postulated many years ago, have so far failed. Zerner's group [N. E. Dixon, P. W. Riddles, C. Gazzola, R. L. Blakeley, and B. Zerner, Can J. Biochem. 58, 1335–1344 (1980)] proposed a mechanism of reaction on the basis of a carbamoyl-transfer reaction and where the substrate is activated toward nucleophilic attack by O-coordination to a $Ni^{2+}$ ion. Both $Ni^{2+}$ ions are involved in this proposed mechanism. A second mechanism of reaction based on the determination of kinetic isotope effects [R. Medina, T. Olleros, and H. L. Schmidt, Proc. 4th Int. Conference on Stable Isotopes, H. L. Schmidt, H. Forstel, and K. Heizinger, eds., Julich, Mar. 1981, Elsevier, Amsterdam, 77–82 (1982)] was proposed. These results indicated the existence of an enzyme-bound carbamate intermediate and demonstrated that the enzyme-Ni-substrate complex decomposes, releasing the first $NH_3$ in a slow, rate-limiting step.

Most enzymes can be poisoned or inhibited by certain chemical reagents. There are two major types of enzyme inhibitors: irreversible and reversible. Irreversible inhibitors combine with or destroy a functional group on the enzyme molecule that is necessary for its catalytic activity. Reversible inhibitors compete with an active site or change the structure of the enzyme and generally are considered to be either competitive or noncompetitive. Competitive inhibitors compete with the substrate for binding to the active site, but once bound, cannot be transformed by the enzyme. An identifying feature of competitive inhibition is that it can be reversed by increasing the substrate concentration. Noncompetitive inhibitors do not bind at the site on the enzyme at which the substrate does; however, their binding to the enzyme alters the structure or conformation of the enzyme so that reversible inactivation of the catalytic site results.

Many urease inhibitors have been identified; however, few kinetic descriptions include the type of inhibition. The reversible and competitive inhibition of sword bean urease by a wide variety of hydroxamic acids was discovered by Kobashi et al. [K. Kobashi, J. Hase, and K. Uehara, *Biochem. Biophys. Acta* 65, 380–383 (1962)]. Kinetic and spectral studies performed by B. Zerner and coworkers [N. E. Dixon, J. A. Hinds, A. K. Fihelly, C. Gazzola, D. J. Winzor, R. L. Blakeley, and B. Zerner, *Can. J. Biochem.* 58, 1323–1334 (1980)] established that hydroxamic acids were reversibly bound to active-site nickel ions in jack bean urease. Chemical and physical studies of the enzymatically inactive phosphoramidate-urease complex provide convincing evidence that phosphoramidate binds reversibly to the active-site nickel ion [N. E. Dixon, R. L. Blakeley, and B. Zerner, *Can. J. Biochem.* 58, 481–488 (1980)].

The kinetics of urease inhibition by phenyl phosphorodiamidate (which demonstrates a competitive inhibition) and hydroquinone (which exemplifies a mixed inhibition mechanism) were performed by L. J. Youngdahl and E. R. Austin at the International Fertilizer Development Center (IFDC, unpublished results). A kinetic study of the soil urease inhibition by six substituted ureas, compounds which are used as herbicides, showed that all six compounds exhibited mixed inhibition characteristics (competitive and noncompetitive) [S. Cervelli, P. Nannipieri, G. Giovannini, and A. Perna, *Pesticide Biochem. Physiol.* 5, 221–225 (1975)].

Many other compounds have been identified as urease inhibitors. Mulvaney and Bremner [R. L. Mulvaney and J. M. Bremner, *Soil Biochem.* 5, 153–196 (1981)] have published an extensive review on urease inhibitors. More recently Gould and coworkers [W. D. Gould, C. Hagedorn, and R. G. L. McCready, "Urea transformations and fertilizer efficiency in soil", *Advances in Agronomy* 40:209–238, (1986)] described a number of urease inhibitors. These inhibitors were classified into three groups (sufhydryl reagents, hydroxamates, and structural analogs of urea and related compounds). Members of these three classes of compounds plus a fourth class (agricultural chemicals which inhibit urease) have been more extensively described by Medina and Radel (R. Medina and R. J. Radel, "Mechanisms of Urease Inhibition," submitted for publication in *Ammonia Volatilization From Urea Fertilizers*, B. R. Bock and D. E. Kissel, eds., to be published by the Tennessee Valley Authority).

Although a wide variety of chemicals have been shown to inhibit urease activity, none have yet been commercialized. Phenyl phosphorodiamidate (PPDA), $(C_6H_5O)PO(NH_2)_2$, has probably been the most widely studied urease inhibitor in recent years and until recently was considered the best known inhibitor. Extensive work directed at commercializing PPDA has been conducted at the Tennessee Valley Authority's National Fertilizer Development Center. Most of this work has been directed at determining the compatibility of PPDA at process conditions typically encountered during urea granulation [J. Gautney, Y. K. Kim, and P. M. Gagen, *I&EC Prod. R&D* 23, No. 3, 483–489 (1984)], in fluid fertilizers [J. Gautney, Y. K. Kim, and A. R. Barnard, "Solubilities and Stabilities of the Nitrogen Loss Inhibitors Dicyandiamide, Thiourea, and Phenyl Phosphorodiamidate in Fluid Fertilizers," *I&EC Prod. R&D* 24, No. 1, 155–161 (1985)], and in solid urea during long-term bulk storage [J. Gautney, A. R. Barnard, D. B. Penney, and Y. K. Kim, "Solid-State Decomposition Kinetics of Phenyl Phosphorodiamidate," *Soil Sci. Soc. Am. J.* 50, 792–797 (1986)]. These studies showed that PPDA can be cogranulated with urea but decomposes relatively rapidly in solid mixtures with urea and in fluid fertilizers. As a result, commercialization of PPDA does not look promising.

Two relatively new inhibitors, thiophoshoryl triamide, (TPTA), $(NH_2)_3PS$ (U.S. SIR No. H25, Radel, Feb. 4, 1986) and N-(n-butyl)-thiophosphoryl triamide (NBTPTA), $[NH(CH_3CH_2CH_2CH_2)]-(NH_2)_2PS$ (U.S. Pat. No. 4,530,714, Kolc et al., Jul. 23, 1985) are currently receiving considerable attention in terms of commercial development. Both of these compounds have been shown to give superior inhibition to PPDA. The Tennessee Valley Authority has been granted a statutory invention registration on TPTA SIR No. H25, supra, and a patent on the use of TPTA in fluid fertilizers '822, supra. The inhibitor NBTPTA was patented by Allied Corporation in 1985 (U.S. Pat. No. 4,530,714, Kolc et al., Jul. 23, 1985).

Fertilizer compatibility studies with TPTA (TVA Bulletin Y-191, "New Developments in Fertilizer Technology," Oct. 1985) showed that this inhibitor can be cogranulated with urea and is relatively stable in fluid fertilizers containing urea, but like PPDA decomposes in solid mixtures with urea (R. J. Radel, J. Gautney, A. A. Randle, J. E. Cochran, R. M. Miles, H. M. Williams, B. R. Bock and N. K. Savant, "Evaluation of Thiophosphoryl Triamide as a Urease Inhibitor," paper presented at the 194th National Meeting of the American Chemical Society, Aug. 30–Sept. 4, 1987, New Orleans, La.) As a result, TPTA has considerable potential for use in urea containing fluid fertilizer but limited potential for use with solid urea. No data are currently available on the compatibility of NBTPTA with fertilizer materials. Field studies with TPTA and NBTPTA in urea containing fluid fertilizers are in progress.

Even though urease has been extensively studied for about 60 years and a large number of compounds have been identified as urease inhibitors, there are no urease inhibitors which are similarly effective as nitrification inhibitors.

The biological oxidation (nitrification) of ammonium nitrogen ($NH_4^+$) to nitrate nitrogen ($NO_3^-$) reaction (3) supra, is an energy-producing process involving a loss of eight electrons by the ammonium nitrogen and resulting in a nitrogen valence change from $-3$ to $+5$. The process is carried out in soils mainly by chemosynthetic autotrophs (Nitrobacteriaceae) in order to derive energy needed for their metabolic activities. The probable reaction sequence for the first step of nitrification (conversion of ammonium to nitrite by nitrosomonas) is: ammonia→hydroxylamine→(nitroxyl?)→(nitrohydroxylamine)?→nitrite. The postulated intermediates nitroxyl (NOH) and nitrohydroxylamine ($NO_2 \cdot NH_2OH$) have not been positively identified, but their participation in the reaction sequence is consistent with the assumption that two electrons are involved in each intermediate oxidation step from ammonium to nitrite (R. D. Hauck, "Mode of Action of Nitrification Inhibitors", *Nitrification Inhibitors-Potentials and Limitations*, ASA Special Publication No. 38, 1980, American Society of Agronomy, Madison, Wis.). The second step of nitrification (conversion of nitrite to nitrate) is a single-step process which is carried out mainly by nitrobacter.

Several intensive searches have been conducted during the past 25 years to find chemicals that can inhibit the biological oxidation of ammonium to nitrate in soils. Since nitrite can be phytotoxic to plants, it is desirable that the first step of the nitrification process, the conversion of ammonium to nitrite, be preferentially inhibited because this avoids subsequent buildup of nitrite. A large number of chemicals have been found to inhibit nitrification. These chemicals include pyridines, pyrimidines, mercapto compounds, succinamides, thiazoles, triazoles, triazines, cyanamid derivatives and various thio compounds [R. D. Hauck, "Technological Approaches to Improving the Efficiency of Nitrogen Fertilizer Use by Crop Plants ", *Nitrogen in Crop Production*, American Society of Agronomy, Madison Wis., 52–560 (1984)]. A number of agricultural pesticides have also been shown to inhibit nitrification. The herbicides, N, N'-dimethyl-4-4-chlorophenyl urea, and ethyl and isopropyl carbamate have been shown to inhibit nitrification [M. H. Briggs and I. Segal, *Life Science* 2, 69–72 (1963)]. The pesticides diazion, manozeb, benzene hexachloride, pentachlorophenol, Vapam, maneb, and isodoacetic are also nitrification inhibitors [T. Nishihara, *Bull. Fac. Agr. Kagoshima Univ.* 12, 107–158 (1962)].

In general, most nitrification inhibitors function by either retarding the growth and/or function of nitrifiers. Inhibition can result from interference with the nitrifiers respiration and cytochrome oxidase function, by production of acid in the microenvironment, by chelation of essential metal ions, and by liberation of toxic compounds such as mercaptans, sulfoxides, and sulfones.

The biochemistry of several naturally occurring and synthetic substances which can act as nitrification inhibitors has been reviewed [J. H. Quastel, *Ann. Rev. Plant Physiol.* 16, 217–240 (1965)]. Methionine and some alkylmercapto amino acids delay the beginning of nitrification. This delay is believed to result from retardation of the proliferation of nitrifying organisms. Cystine and cysteine indirectly impede nitrification. Quastel [J. H. Quastel, *Plant Physiol.*, Vol. 3 (F. C. Steward, ed.), Academic Press, New York, 671–756 (1963)], suggested that these compounds are decomposed by soil heterotrophs with the formation of sulfuric acid which decreases soil pH to a level less favorable for nitrification. Later researchers [J. M. Bremner and L. G. Bundy, *Soil. Biol. Biochem.* 6, 161–165 (1974)] presented evidence that cystine, cysteine, methionine, and other nonvolatile organic sulfur compounds may inhibit nitrification by decomposition to toxic carbon disulfide. Thiourea and allylthiourea are thought to inhibit nitrification by complexing with metallic cations such as $Cu^{+2}$, which are needed for the process of nitrification [J. H. Quastel, *Ann. Rev. Plant Physiol.* 16, 217–240 (1965)]. Copper chelating agents, such as salicyladoxime and sodium diethyldithiocarbamate, also retard nitrification [H. Lees, *Metabolic Inhibitors* 2, (R. H. Hochester and J. H. Quastel, eds.), Academic Press, New York, 615–629 (1963)]. Addition of copper cation ($Cu^{+2}$) has been shown to somewhat counteract the nitrification inhibition effect of thiourea but not that of allylthiourea [E. R. Campbell and M.I.H. Aleem, *Antione van Leeuwenhoek, J. Microbiol. Serol.* 31, 124–136 (1965)]. In contrast to thiourea, the inhibitors ethyl urethane [J. H. Quastel, *Plant Physiol.* 3 (F. C. Steward, ed.), Academic Press, New York, 671–756 (1963)], 2-chloro-6-(trichloromethly) pyridine [C.A.I. Goring, *Soil Science* 93, 211–218 (1962)], sodium azide, and dicyandiamide retard nitrification by acting directly on the nitrosomonas species involved in the first step of nitrification [T. Nishihara, *Bull. Fac. Agr. Kagoshima Univ.* 12, 107–158 (1962)]. The inhibitors, phenyl mercuric acetate, mono- and di-chlorophenyl isothiocyanates, and sodium chlorate preferentially inhibit the second step of the nitrification process, the conversion of nitrite to nitrate, [R. D. Hauck, "Synthetic Slow-Release Fertilizers and Fertilizer Amendments", *Organic Chemicals in the Soil Environment* 2, (C.A.I. Goring and J. W. Hamaker, eds.), Marcel Dekker, New York, 633–690 (1972)].

Although a large number of many different types of compounds have been found to inhibit nitrification (many which of are patented), only seven have been recently produced commercially for use as nitrification inhibitors. Four of these [2-amino-4-chloro-6-methyl pyridine (AM), 2-mercaptobenzothiazole (MBT), sulfathiazole (ST), and thiourea (TU)] are produced and marketed primarily in Japan.

In the United States, the compound 2-chloro-6-trichloromethyl pyridine (nitrapyrin), was commercialized as N-Serve ® in 1974 and has remained on the market since that time. Another compound, 5-ethoxy-3-trichloromethyl-1,2,4-thiadiazole (ETT) was licensed in the United States as a nitrification inhibitor by Olin Corporation in 1982. Olin had previously marketed the compound as a fungicide under the trade name Terrazole. Terrazole was marketed by Olin as a nitrification inhibitor under the trade name Dwell for about one year but was withdrawn from the market when Olin's Agrichemicals Division was allegedly purchased by Uniroyal Inc., i.e., about Oct. 1 of 1983. Uniroyal apparently is not presently marketing Dwell. The compound dicyandiamide (Dd, DCD, Dicyan) has received much attention in the United States in recent years because it appears to offer some advantages over nitrapyrin and ETT. Both nitrapyrin and ETT have relatively high vapor pressures. These vapor pressures prevent cogranulation of nitrapyrin and ETT with solid fertilizers such as urea. Their use with nitrogen solutions is also limited because of volatilization losses during fertilizer processing and application. As a result, nitrapyrin and ETT are used primarily with anhydrous ammonia; however, even then special precautions must be taken. Nitrapyrin can be tank-mixed with anhydrous ammonia but has a maximum recommended shelf life of three weeks (Dow Chemical Company USA. "N-Serve Nitrogen Stabilizer," *Technical Information Bulletin*, Ag-Organics Department, Midland, Mich.). ETT cannot be tank-mixed with anhydrous ammonia and therefore must be applied simultaneously from a separate tank. DCD, on the other hand, has very little vapor pressure and as a result can be cogranulated with solid fertilizers, such as urea, without significant losses of inhibitor [J. Gautney, Y. K. Kim, and P. M. Gagen, *Ind. Eng. Chem. Prod. Res. Dev.* 23, No. 3, 483–489 (1984)]. Dicyandiamide is also stable in anhydrous and aqueous ammonia solutions [J. Gautney, Y. K. Kim, and P. M. Gagen, *Ind. Eng. Chem. Prod. Res. Dev.* 24, No. 4, 645–650 (1985)].

Dicyandiamide is produced and marketed in Japan and more recently is being produced in West Germany and test-marketed in the United States as a slow-release nitrogen fertilizer. It appears that dicyandiamide is currently not registered as a nitrification inhibitor in the United States. Although DCD offers a number of advantages over nitrapyrin and ETT in terms of fertilizer compatibility, like nitrapyrin and ETT, it is relatively expensive to use, especially for use with fertilizer materials.

An intensive search of the literature has revealed only two instances in which phosphorus-containing compounds have shown nitrification inhibition properties. U.S. Pat. No. 4,315,762, Evrard, Feb. 16, 1982, describes the use of aluminum Tris(O-ethyl phosphonate) I. These materials which have a covalent aluminum-phosphorus bond are of the formula

I

The second instance describes the results of a series of tests on nine phosphoroamides which were found effective as urease inhibitors [J. M. Bremner, G. W. McCarty, J. C. Yeomans, and H. S. Chai, *Commun. Soil Sci. Plant Anal.* 17, 369–84]. Of the nine phosphoroamides tested, only two exhibited minimal inhibitory activity, the trichloroethyl phosphorodiamidate (II) and n-butyl-phosphorothioic triamide III). These phosphoroamides have the structures shown infra. This later compound appeared to inhibit nitrification only at very high rates of application (10 to 20 times), and to a much lower extent (25 to 33 percent) when compared to nitrapyrin or etridiazole (both commercial inhibitors) in terms of inhibitor to soil ratios and incubated at 20° C. When the incubation temperature is raised to 30° C., the inhibition is even lower (4–12 percent).

II

III

Embodiment No. 2: There is little consensus concerning optimum ammonium/nitrate ratios for crop growth. This is not suprising since the ammonium/nitrate ratio available to roots affects physiological processes by a number of mechanisms. This area of concern was recently reviewed by B. R. Bock (1986). Increasing cereal yields with higher ammonium/nitrate ratios:review of potentials and limitations [*J. Environ. Sci. Health*, A21:7-23–758]. A summary of this review is given below.

Hageman [R. H. Hageman, Ammonium versus nitrate nutrition of higher plants, 67–85 (1984)] and Hauck [R. D. Hauck (ed.), Nitrogen in crop production, American Society of Agronomy, Madison, Wis.] reviewed several of these mechanisms and their physiology.

First, the ammonium/nitrate ratio in the root medium affects nitrogen fertilizer adsorption rates by roots. Relative rates of ammonium and nitrate absorption are affected by temperature, pH, ionic composition of the soil solution, and stage of plant growth, making generalizations about ammonium/nitrate ratio effects on nitrogen fertilizer absorption rates difficult. However, there appears to be some potential for increasing cereal yields by manipulating ammonium/nitrate ratios to enhance nitrogen fertilizer uptake rates, particularly during reproductive growth stages.

Second, since nitrogen fertilizer is absorbed in relatively large quantities compared with other inorganic plant nutrients, the ionic form of nitrogen fertilizer absorbed affects uptake of other cations and anions. This affects the level of inorganic nutrients absorbed by plant roots and also the metabolic requirements for regulating ionic balance and pH within the plant.

Third, the rhizosphere tends to become acidic when ammonium is the dominant form absorbed by roots and tends to become alkaline when nitrate is the dominant nitrogen fertilizer form absorbed. These pH changes can affect plant growth either directly via $H^+$ ions or by affecting the availability of plant nutrients or toxic elements to plant roots.

A fourth mechanism relates to the potential for toxic levels of unassimilated ammoniacal nitrogen fertilizer within plants. Unassimilated ammoniacal nitrogen fertilizer is present in plants as both ammonium and $NH_3(aq)$ with relative levels determined by the following equilibrium:

$$NH_3 + H_2O \rightleftharpoons NH_4^+ + OH^- \tag{4}$$

Both species can be toxic to plants [H. M. Reisenhauer, "Absorption and Utilization of Ammonium Nitrogen by Plants", 157–170 (1978) and, D. R. Nielsen and J. G. MacDonald (eds.), "Nitrogen in the Environment", Vol. 2. Soil-plant nitrogen relationships, *Academic Press*, New York]. The term ammonium toxicity will be used hereafter to designate direct adverse effects of unassimilated ammonium and/or aqueous $NH_3$ on plant growth.

When external ammonium is readily available, ammonium absorption by roots can be more rapid than ammonium assimilation processes which detoxify the absorbed ammonium. This can result in ammonium toxicity because plants tolerate only relatively low levels of unassimilated ammonium. More rapid uptake than assimilation of ammonium is a problem, particularly when low light intensities or other environmental factors limit production of carbon skeletons required for assimilation. In contrast, nitrate can assimilate in plants to relatively high levels without adverse effects on growth. Physiologically regulated mechanisms ensure that toxic ammonium levels do not develop from reduction of nitrate.

A fifth mechanism relates to energy requirements for nitrogen fertilizer assimilation. Ammonium assimilation requires less energy than nitrate assimilation in non-chlorophyllous tissue such as roots or in shaded chlorophyllous tissue of organs. However, in chlorophyllous organs (primarily leaves), nitrate assimilation may require no more energy than ammonium assimilation in terms of carbohydrate reserves.

Raven and Smith [J. A. Raven and F. A. Smith, "Nitrogen Assimilation and Transport in Vascular Land Plants in Relation to Intracellular pH Regulation," *New Phytol.* 76:415–431 (1976)] reviewed several aspects of a sixth mechanism, pH regulation, within the plant. The form of nitrogen fertilizer affects both internal pH and metabolic requirements for regulating pH. Nitrate assimilation generates $OH^-$ ions, mainly in shoots where pH is regulated by a biological pH-stat that produces organic acids from neutral precursors. Hydrogen ions from these acids neutralize alkalinity from nitrate assimilation. The resulting organic acid anions are either stored in shoots to maintain ionic balance or transported to roots with subsequent release of $OH^-$ ions into the soil solution. Up to 10 percent of the organic carbon in the plant can be involved in organic acid anion storage resulting from operation of the pH-stat. Operation of the pH-stat places significant demands on carbon and energy economies of the plant and can cause problems in regulating cell turgor and volume. Alternatively, ammonium assimilation generates $H^+$ ions, mainly in roots where pH is regulated by excreting $H^+$ ions into the soil solution. The latter type of internal pH regulation places minimal demands on the plant.

Tsai, et al. [C. Y. Tsai, H. L. Warren, and D. M. Huber, "The Kernel Nitrogen Fertilizer Sink as a Biological Yield Component in Maise," Proceedings of 37th Annual Corn and Sorghum Research Conference, 52–66 (1982)] suggest a seventh mechanism arising from enhanced sucrose movement from leaves to roots with ammonium assimilation compared with that for nitrate assimilation. Ammonium assimilation typically occurs immediately after absorption by roots as a means of detoxifying ammonium and requires a readily available supply of organic acids which are derived from sucrose. This demand is thought to enhance sucrose movement from leaves to roots and thereby reduce "feedback" inhibition of photosynthesis. However, excess ammonium can reduce plant growth by depleting carbon required for growth, particularly during the seedling stage when photosynthetic capacity is low or when environmental conditions severely limit photosynthesis. In contrast, nitrate assimilation results in less carbon translocation from leaves to roots, providing less potential for either reducing "feedback" inhibition of photosynthesis or depleting carbon reserves required for growth. This is because nitrate assimilation occurs to a large extent in shoots, and significant quantities of nitrate are stored as nitrogen fertilizer reserves before being assimilated.

An eighth possible mechanism relates to nitrate reductase activity as a growth limiting factor in some situations. Olsen [S. R. Olsen, "The Role of Organic Matter and Ammonium in Producing High Corn Yields," Proceedings of International Symposium on Peat in Agriculture and Horticulture, Bet Dagan, Israel (1983)] concluded that when plants rely mainly on nitrate as a nitrogen fertilizer source, nitrate reduction can be the rate-limiting step in the supply of reduced nitrogen fertilizer to plants and, in turn, a growth limiting factor. Shaded leaves and high-yield agriculture were cited as situations where nitrate reductase activity likely limits yields. In these situations, substituting some ammonium for nitrate in the root medium may remove nitrate reduction as a growth-limiting step in the supply of reduced nitrogen fertilizer for the plant. Shaner and Boyer [D. L. Shaner and J. S. Boyer, "Nitrate Reductase Activity in Maize (Zea mays L.) Leaves," I. "Regulation of Nitrate Flux," *Plant Physiol.* 58:499–504 1976 (1976)] found that the flux of nitrate to leaves rather than the nitrate reductase enzyme is more often the limiting factor in nitrate assimilation, in which case ammonium could serve as a supplemental source of reduced nitrogen fertilizer to the leaves.

Finally, ammonium/nitrate ratios absorbed by plant roots affect the biochemistry of plants in several respects not mentioned above, including the activity of several enzymes [Hageman, ibid., S. S. Sham, and R. C. Huffaker, "Nitrogen Toxicity in Plants," 97–118 (1984)] and [R. D. Hauck (ed.). "Nitrogen in Crop Production," American Society of Agronomy, Madison, Wis.].

Relatively little is known about the optimum ratios necessary for maximum crop yields. Recent studies have shown, however, that high ammonium/nitrate ratios during early plant growth can result in decreased yields [B. R. Bock, "Agronomic Difference between Nitrate and Ammoniacal Nitrogen," Proceedings of the 37th Annual Meeting Fertilizer Industry Round Table, 105–106 (1987)]. In a field study using urea and DCD, ratios as high as 31:1, within 11 days of planting, i.e., during at least a portion of the germination stage, significantly reduced yields at harvest (by about 10 percent), even though ratios remained high during the remaining portion of the growing season.

Although no studies have documented the exact ratios needed for optimum plant growth and yield, it is postulated that high ammonium/nitrate ratios during the reproduction, or in the case of grain crops, during the grain-filling stage are necessary for maximum yields (Bock, ibid, p.11 1986).

From the above information, it is clear that although a large number of compounds have been identified and are patented separately as urease inhibitors or as nitrification inhibitors, there is no single inhibitor which meets all the needs of American agriculture. The present invention relates to the discovery that there are specific compounds which meet such multiple needs, as such dual-purpose nitrification and urease inhibition.

SUMMARY OF THE INVENTION

The present invention relates to the use of thiophosphoryl triamide as both a urease and a nitrification inhibitor. It has been discovered, quite unexpectedly, that in addition to its previously known urease inhibition characteristics, this material is also an effective nitrification inhibitor. By virtue of these multiple inhibition characteristics, thiophosphoryl tiramide is eminently suitable for the control of urease hydrolysis, nitrification of ammonium to nitrate, and of a new characteristic of controlling and maintaining relative levels of ammonia and nitrate in the soil which are necessary for the proper ammonium/nitrate nutrition of agricultural crops.

OBJECTS OF THE INVENTION

The principal object of embodiment 1of the present invention is to identify and characterize thiophosphoryl triamide as an effective nitrification inhibitor in agricultural soil systems, which, when admixed with ammonia, ammonium-containing fertilizers, or fertilizers such as urea which hydrolyzes to ammonia or ammonium after application to the soil, will prevent or greatly reduce the loss of nitrogen by leaching and denitrification from agricultural soils resulting from the biological oxidation of ammonium-nitrogen to nitrate-nitrogen.

A further object of Embodiment 1 of the present invention is to prevent or reduce nitrate pollution of groundwaters resulting from the nitrification of ammonium-nitrogen to nitrate-nitrogen in soil systems.

The principal object of Embodiment 2 of the present invention is to identify and characterize thiophosphoryl triamide as the first in a new class of agricultural chemicals, ammonium/nitrate nutrition control agents, which will control both nitrification and urease inhibition such that specific levels of ammonium and nitrate can be maintained in the cropping system, thus resulting in higher yield plateaus for agricultural crops.

Still further and more general objects and advantages of both Embodiments of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWINGS

The present invention, together with further objects and advantages thereof, will be better understood from a consideration of the following descriptions taken in connection with the accompanying drawings in which:

FIG. 5 is a bar graph showing the ammonium/nitrate nutrition ratios (as calculated from the data of Example II) for dicyandiamide (DCD), thiophosphoryl triamide (TPTA), and N-(n-Butyl)-thiophosphoryl triamide (NBTPTA) (as calculated from the data of Example II). Note that DCD shows a high ammonium/nitrate ratio (78:1) at the 1-week interval, which could be detrimental to seedling germation, plant development, and crop yield. The ratio then remains relatively stable between 5:1 and 7:1. On the other hand, TPTA shows a gradually increasing ammonium/nitrate ratio and peaks at the 4-week interval. I have found that this peak in ammonium/nitrate ratio can be shifted in time and height by varying the concentration of the TPTA ammonium/nitrate nutrition control agent, and can be maximized according to crop needs.

For the sake of convenience and greater appreciation of the results of the discoveries leading to the present invention, as noted supra, more specific references to FIGS. 1-5 are combined with the appropriate discussion of pertinent data and presented therewith in Embodiment 1 and 2, Example I infra, and Embodiment 2, 3, and 4, Example II infra.

DESCRIPTION OF PREFERRED EMBODIMENTS

For ease and convenience of application, the thiophosphoryl triamide may be incorporated into solid fertilizers containing ammonium and/or urea and/or other solid nitrogen fertilizers, which hydrolyze to yield ammonium after application to the soil, by mixing, prilling, granulating, coating, or other means familiar to those knowledgeable in the art of producing and/or blending solid fertilizer materials. Similarly, the thiophosphoryl triamide can be incorporated into anhydrous ammonia and solutions or fluid fertilizers containing ammonium and urea or other nitrogen fertilizers which hydrolyze to yield ammonium after application to the soil by dissolving solid thiophosphoryl triamide in anhydrous ammonia and by dissolving or suspending solid thiophosphoryl triamide in said fluid fertilizers. The dissolution and suspending process may be aided by mechanical mixing, addition of suspending agents, or other means knowledgeable to those skilled in this art and generally acquainted with various method and means for producing and/or blending fluid fertilizers. Thiophosphoryl triamide can also be applied directly to soils prior to, subsequent to, or during fertilizer application by broadcasting solid thiophosphoryl triamide onto the soil or by dissolving thiophosphoryl triamide in water or other appropriate solvents and spraying the resultant inhibitor solution onto the soil.

TESTING METHODS

Embodiment 1: The thiophosphoryl triamide was tested for nitrification inhibition using the soil testing procedure described below.

Mountainview silt loam soil was screened through a 2-mm sieve. Plexiglas containers ($8 \times 8 \times 6$ cm) were packed half-full with the soil and packed to a bulk density of 1.0 g/$^3$ and wetted to field capacity (approximately 20 weight percent moisture). The ammonium sulfate (887 mg per container which supplied N equal to that of 410 mg urea) and inhibitor (41 mg per container at the 10 percent level, urea basis) were added in a narrow band, i.e., about 0.5 cm, and additional soil was added to fill the containers. The total amount of dry soil added was 384 g. The containers were incubated at 25° C. During incubation, the containers were checked periodically for moisture loss and additional water added as needed to maintain moisture levels.

The individual containers were removed from the incubator at 1-, 2-, 3-, 4-, and 5-week intervals. After removal from the incubator, the contents of the container were transferred to a plastic bag and thoroughly mixed. A 10-g sample of soil (dry basis) was taken from the bag and extracted with 100 ml of 2N KCL. The extract was filtered through Whatman #41 filter paper and refrigerated until analyzed. Samples were analyzed for $NO_3$-N, $NO_2$-N, and urea-N using a colorimetric procedure. The samples were also analyzed for $NH_4$-N. In each test situation, 2 replicates were utilized to obtain the average values reported in Table II, infra.

The percent nitrification inhibition was calculated according to the method of Bundy and Bremner [G. L. Bundy and J. M. Bremner, *Soil Sci. Soc. Am. Proc.* 37:396–398 (1973)].

% nitrification inhibition = $[(C-S)/C] \times 100$ where C=net amount of $NO_3$-N produced in the control (no inhibitor added), and S=net amount of $NO_3$-N produced in the inhibitor treated sample.

Embodiment No. 2: The thiophosphoryl triamide was tested as a dual purpose nitrification inhibitor/urease inhibitor using the testing procedure employed above with urea as the nitrogen source. Mountainview silt loam soil was screened through a 2-mm sieve. Plexiglas containers (8×8×6 cm) were packed half-full with the soil and packed to a bulk density of 1.0 g/$^3$ and wetted to field capacity (approximately 20 weight percent moisture). The urea (410 mg per container) and inhibitor (41 mg per container at the 10 percent level, urea basis) were added in a narrow band, i.e., about 0.5 cm, and additional soil was added to fill the containers. The total amount of dry soil added was 384 g. The containers were incubated at 25° C. During incubation, the containers were checked periodically for moisture loss and additional water added as needed to maintain moisture levels.

The individual containers were removed from the incubator at 1-, 2-, 3-, 4-, and 5-week intervals. After removal from the incubator, the contents of the container were transferred to a plastic bag and thoroughly mixed. A 10-g sample of soil (dry basis) was taken from the bag and extracted with 100 ml of 2N KCL. The extract was filtered through Whatman #41 filter paper and refrigerated until analyzed. Samples were analyzed for $NO_3$-N, $NO_2$-N, and urea-N using a colorimetric procedure. The samples were also analyzed for $NH_4$-N. In each test situation, 2 replicates were utilized to obtain the average values reported in Table II, infra.

The percent nitrification inhibition was calculated according to the method of Bundy and Bremner [G. L. Bundy and J. M. Bremner, *Soil Sci. Soc. Am. Proc.* 37:396–398 (1973)].

% nitrification inhibition = $[(C-S)/C] \times 100$ where C=net amount of $NO_3$-N produced in the control (no inhibitor added), and S=net amount of $NO_3$-N produced in the inhibitor treated sample.

EXAMPLES

In order that those skilled in the art may better understand how the various embodiments of the present invention may be utilized and incorporated into various means and method for the practice thereof, the following examples are given by way of illustration and not necessarily by way of limitation.

EXAMPLE I

The thiophosphoryl triamide was tested for its ability to inhibit nitrification in soils by the soil testing method for Embodiment 1 as described above. Samples were not analyzed for nitrite. Dicyandiamide was added for comparison as a nitrification inhibitor and NBTPTA for comparison as a urease inhibitor. The results (depicted graphically in FIGS. 1 and 2 and tabulated in Table I, infra) showed that nitrification inhibition obtained with thiophosphoryl triamide was less than that obtained with dicyandiamide, but significantly greater than that obtained with NBTPTA and remained at about the 50 percent level after 5 weeks. These data clearly show that thiophosphoryl triamide is an effective nitrification inhibitor in soil systems.

TABLE I

| Inhibitor | | mg $NO_3$—N | % Inhibition | mg $NH_4$—N | $NO_3$—N + $NH_4$—N | % N recovered |
|---|---|---|---|---|---|---|
| 1 WEEK | | | | | | |
| $(NH_4)_2SO_4$ | | 18.0 | 0.0 | 145.9 | 163.9 | 86.9 |
| DCD | 4.1 mg | 15.7 | 12.8 | 142.5 | 158.2 | 83.9 |
| TPTA | 4.1 mg | 18.8 | −4.4 | 144.4 | 163.2 | 86.5 |
| NBTPTA | 4.1 mg | 24.6 | −36.7 | 146.7 | 171.3 | 90.8 |
| DCD | 41.0 mg | 3.1 | 82.8 | 155.9 | 159.0 | 84.3 |
| TPTA | 41.0 mg | 3.8 | 78.9 | 166.7 | 170.5 | 90.4 |
| NBTPTA | 41.0 mg | 16.5 | 8.3 | 145.2 | 161.7 | 85.7 |
| 2 WEEKS | | | | | | |
| $(NH_4)_2SO_4$ | | 122.5 | 0.0 | 62.60 | 185.1 | 98.46 |
| DCD | 4.1 mg | 54.9 | 55.2 | 110.60 | 165.5 | 88.03 |
| TPTA | 4.1 mg | 114.8 | 6.3 | 66.00 | 180.8 | 96.17 |
| NBTPTA | 4.1 mg | 134.0 | −9.4 | 56.10 | 190.1 | 101.12 |
| DCD | 41.0 mg | 4.6 | 96.2 | 149.80 | 154.4 | 82.13 |
| TPTA | 41.0 mg | 23.0 | 81.2 | 138.60 | 161.6 | 85.96 |
| NBTPTA | 41.0 mg | 110.2 | 10.0 | 63.40 | 173.6 | 92.34 |
| 3 WEEKS | | | | | | |
| $(NH_4)_2SO_4$ | | 122.5 | 0.0 | 14.20 | 136.7 | 72.48 |
| DCD | 4.1 mg | 65.3 | 46.7 | 105.60 | 170.9 | 90.62 |
| TPTA | 4.1 mg | 160.1 | −30.7 | 27.30 | 187.4 | 99.36 |
| NBTPTA | 4.1 mg | 172.0 | −40.4 | 13.80 | 185.8 | 98.52 |
| DCD | 41.0 mg | 5.8 | 95.3 | 150.10 | 155.9 | 82.66 |
| TPTA | 41.0 mg | 73.7 | 39.8 | 108.70 | 182.4 | 96.71 |
| NBTPTA | 41.0 mg | 147.5 | −20.4 | 25.30 | 172.8 | 91.62 |
| 4 WEEKS | | | | | | |
| $(NH_4)_2SO_4$ | | 179.3 | 0.0 | 4.60 | 183.9 | 97.82 |

TABLE I-continued

| Inhibitor | | mg NO$_3$—N | % Inhibition | mg NH$_4$—N | NO$_3$—N + NH$_4$—N | % N recovered |
|---|---|---|---|---|---|---|
| DCD | 4.1 mg | 89.1 | 50.3 | 89.90 | 179.0 | 95.21 |
| TPTA | 4.1 mg | 180.1 | −0.4 | 15.00 | 195.1 | 103.78 |
| NBTPTA | 4.1 mf | 188.9 | −5.4 | 7.70 | 196.6 | 104.57 |
| DCD | 41.0 mg | 5.8 | 96.8 | 160.10 | 165.9 | 88.24 |
| TPTA | 41.0 mg | 99.5 | 44.5 | 85.60 | 185.1 | 98.46 |
| NBTPTA | 41.0 mg | 163.6 | 8.8 | 13.40 | 177.0 | 94.15 |
| 5 WEEKS | | | | | | |
| (NH$_4$)$_2$SO$_4$ | | 180.5 | 0.0 | 1.20 | 181.7 | 96.65 |
| DCD | 4.1 mg | 57.2 | 68.3 | 102.90 | 160.1 | 85.16 |
| TPTA | 4.1 mg | 176.3 | 2.3 | 4.60 | 180.9 | 96.22 |
| NBTPTA | 4.1 mg | 172.8 | 4.3 | 0.00 | 172.8 | 91.91 |
| DCD | 41.0 mg | 5.0 | 97.2 | 157.80 | 162.8 | 86.60 |
| TPTA | 41.0 mg | 84.5 | 53.2 | 100.20 | 184.7 | 98.24 |
| NBTPTA | 41.0 mg | 172.0 | 4.7 | 1.90 | 173.9 | 92.50 |

All containers had 384 g soil (dry), 887 mg (NH$_4$)$_2$SO$_4$ (188.0 mg N) and 41.0 mg inhibitor. Samples were extracted 10 g–100 mls 2N KCl. Formulas used for calculations are:

$$\% \text{ Inhibition} = \frac{C - S}{C} \times 100$$

C=Net NO$_3$-N produced in control (no inhibitor).
S=Net NO$_3$-N produced in inhibitor-treated sample.
Net NO$_3$-N=(NO$_3$-N)-(Soil NO$_3$-N).
Values in table are averages of two replicate samples. No significant nitrite accumulations found at any of the sampling times.

Figure 1:
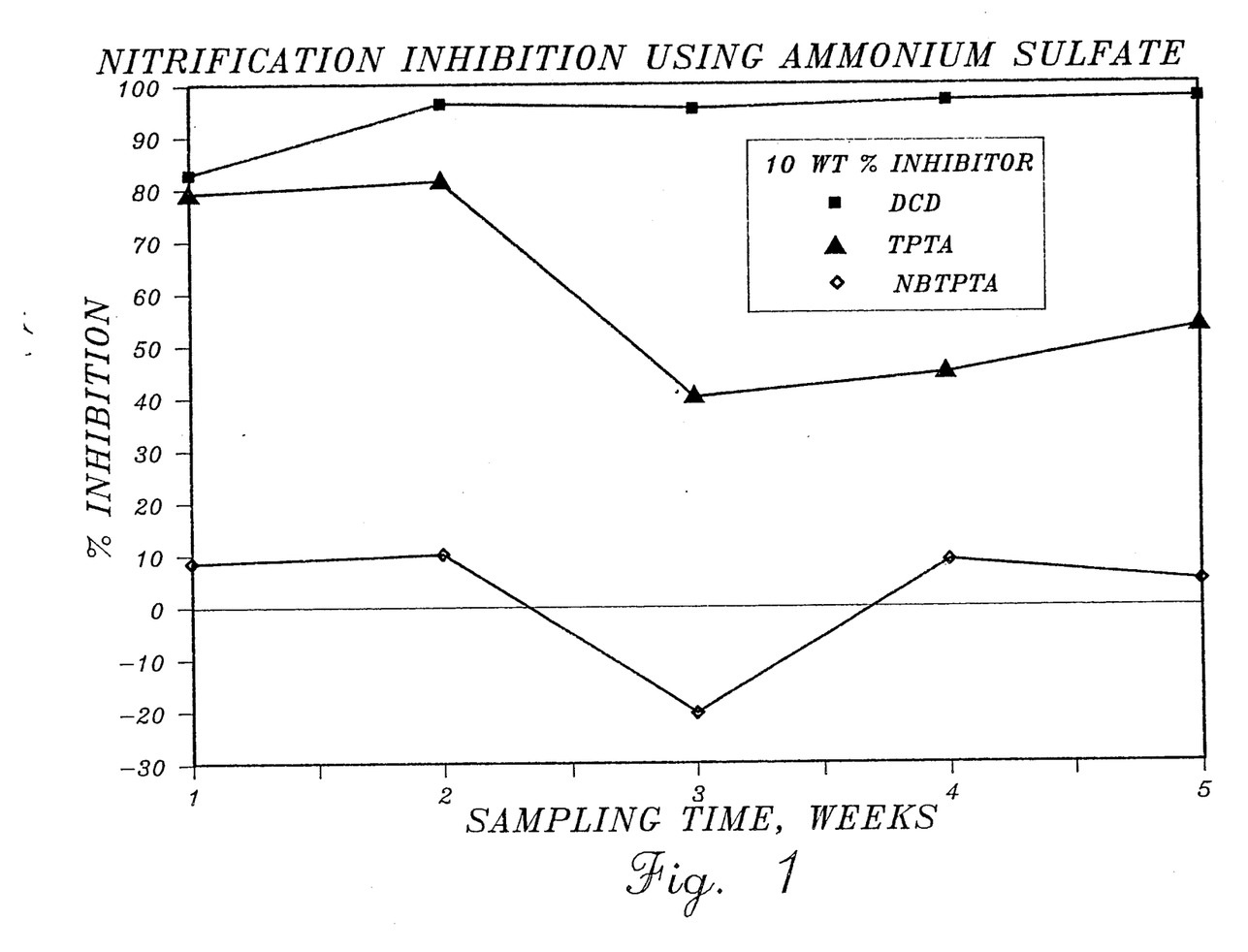
FIG. 1 is a line graph depicting the nitrification inhibition effect of thiophosphoryl triamide (TPTA), dicyandiamide (a known nitrification inhibitor added for reference purposes), and N-(n-BUTYL)-thiophosphoryl triamide (NBTPTA) (another effective urease inhibitor) in a banded soil system at 25° C. with ammonium sulfate as the nitrogen source. The results show the percent nitrification inhibition after 1, 2, 3, 4, and 5 weeks' incubation. The concentration of the inhibitor was 10 weight percent of the nitrogen in the ammonium sulfate.
Figure 2:
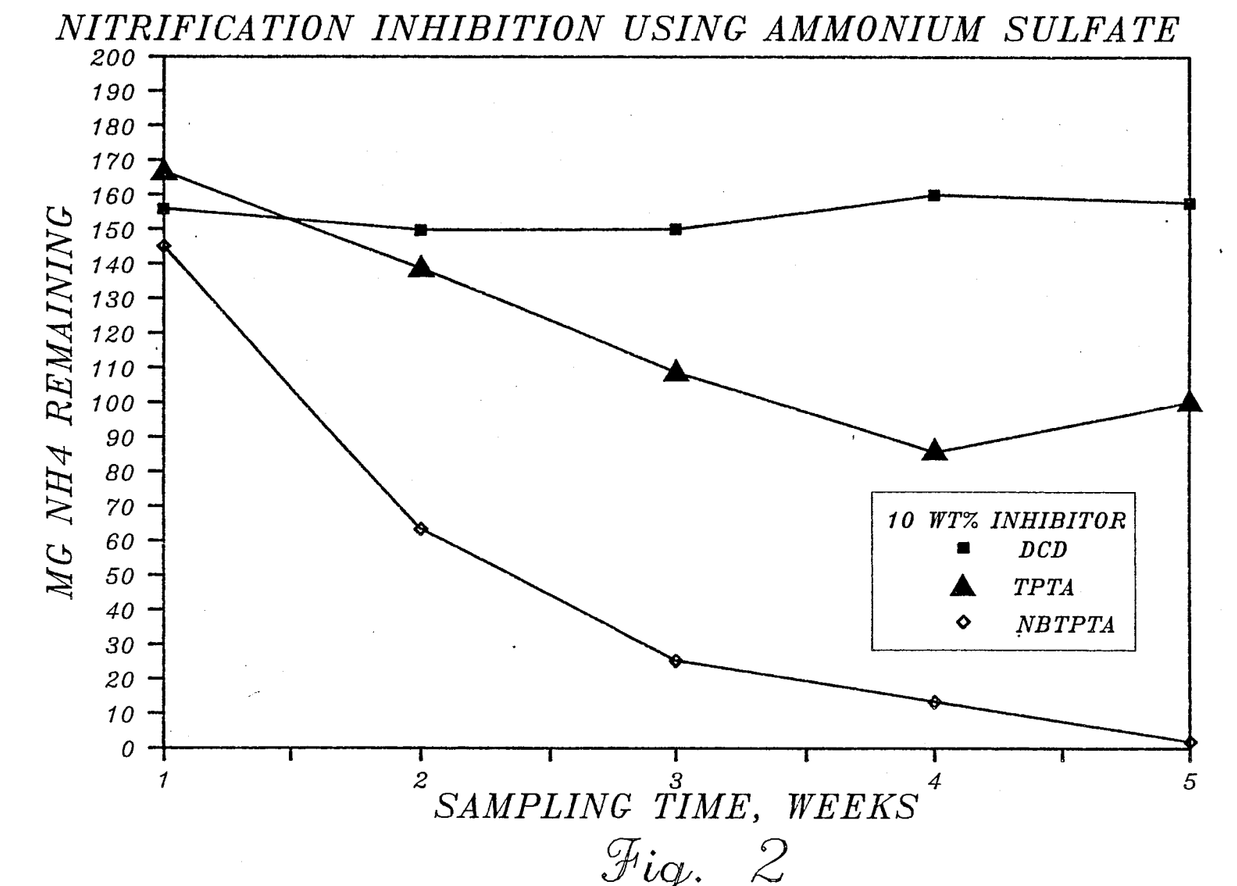
FIG. 2 is a line graph showing the milligrams of ammonium in the soil system for thiophosphoryl triamide (TPTA), dicyandiamide, and N-(n-BUTYL)-thiophosphoryl triamide (NBTPTA) in a banded soil system at 25° C. with ammonium sulfate as the nitrogen source at each of the sampling times in this same test as FIG. 1, supra.
Figure 3:
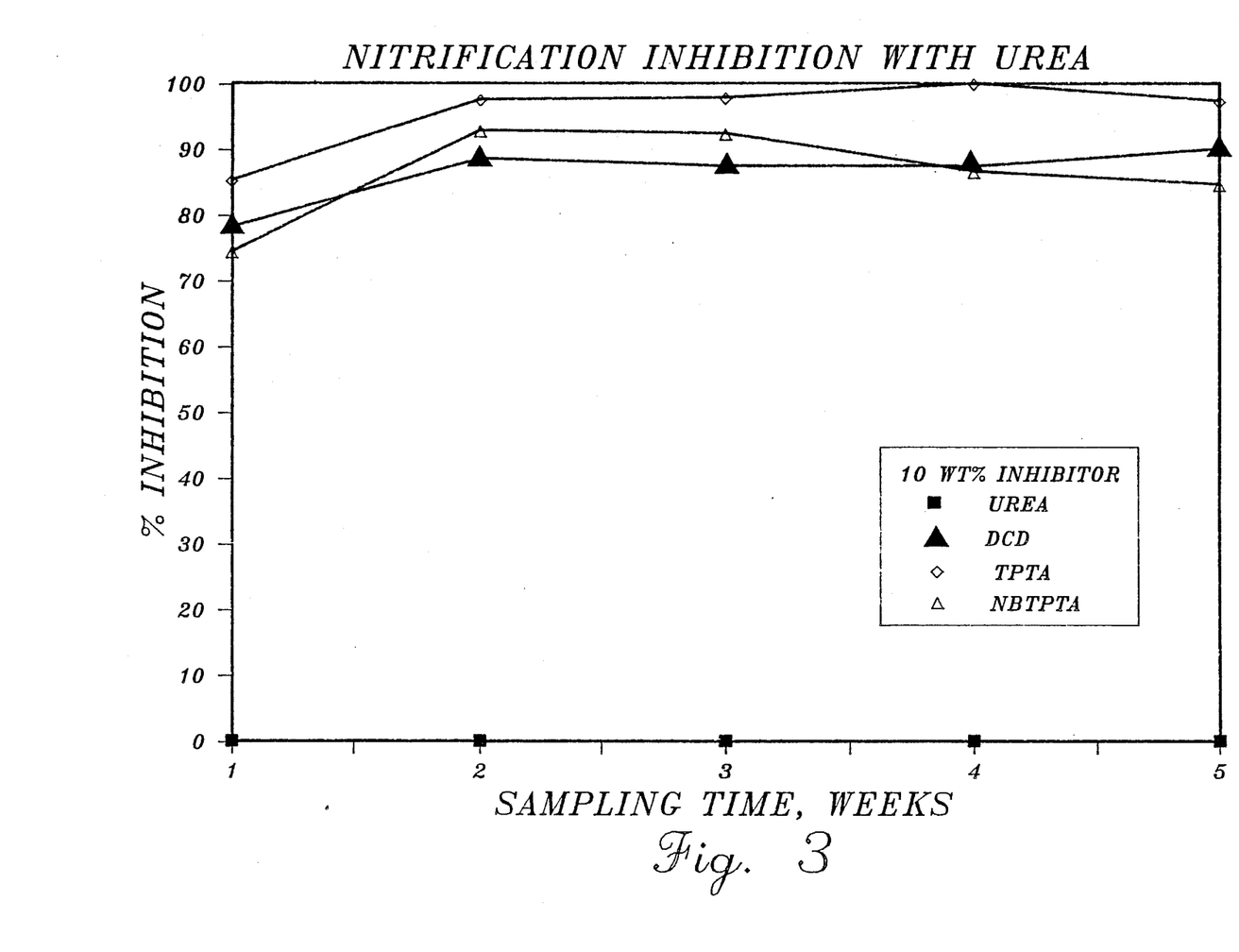
FIG. 3 is a line graph depicting the apparent nitrification inhibition effect of thiophosphoryl triamide (TPTA), dicyandiamide, and N-(n-BUTYL)-thiophosphoryl triamide (NBTPTA) in a banded soil system at 25° C. with urea as the nitrogen source. The urea control is included in the figure for reference purposes. Although the nitrification inhibition is calculated as in FIG. 1 supra, the apparent nitrification inhibition is a result of both nitrification and urease inhibition of the TPTA and NBTPTA.

Examination of FIG. 2, which graphically depicts the ammonium remaining in the sample at each of the sampling intervals, shows that significant levels of ammonium remain for TPTA at the 5-week sampling time, while no ammonium is present for the NBTPTA, thus confirming the nitrification inhibition effect of TPTA and the inability of NBTPTA to inhibit nitrification.

EXAMPLE II

The thiophosphoryl triamide was tested for its ability to inhibit nitrification in soils by the soil testing method for Embodiment 2 as described above. The inihibitor dicyandiamide and urea without inhibitor were tested for comparison. The results given in Table II infra and plotted in FIGS. 3, 4, and 5 supra show that even after 5 weeks' incubation at 25° C., 99.6 percent apparent nitrification inhibition was obtained with thiophosphoryl triamide compared to 90 percent inhibition for the DCD treatment, 80 percent inhibition for the NBTPTA treatment, and 0 percent for the urea without inhibitor.

TABLE II

Nitrification Inhibition Tests with TPTA and NBTPTA - 5 Weeks' Incubation

| Inhibitor | Net mg NO$_3$—N | % Inhibition | NH4-N | Urea-N | Total (NO$_3$ + NO$_4$ + urea-N) | % N recovered | Ratio NH$_4$/NO$_3$ |
|---|---|---|---|---|---|---|---|
| 1 WEEK | | | | | | | |
| Urea | 21.0 | 0.0 | 107.9 | | 129 | 68.40 | 5.0:1 |
| DCD | | 4.6 | 78.2 | 117.2 | 121.8 | 64.58 | 78.2:1 |
| TPTA | 3.1 | 85.3 | 21.5 | 182.4 | 207 | 109.76 | 7.0:1 |
| NBTPTA | 5.4 | 74.4 | 18.5 | 192 | 215.9 | 114.48 | 3.4:1 |
| 2 WEEKS | | | | | | | |
| Urea | 155.5 | 0.0 | 30.80 | | 186.3 | 98.78 | 0.2:1 |
| DCD | 17.7 | 88.6 | 134.20 | | 151.9 | 80.54 | 7.8:1 |
| TPTA | 3.8 | 97.6 | 46.50 | 159.40 | 209.7 | 111.19 | 12.10:1 |
| NBTPTA | 11.1 | 92.9 | 5.80 | 197.80 | 214.7 | 113.84 | 0.5:1 |
| 3 WEEKS | | | | | | | |
| Urea | 180.1 | 0.0 | 2.30 | | 187 | 99.15 | 4.3:1 |
| DCD | 22.7 | 87.4 | 130.00 | | 148.4 | 78.69 | 5.7:1 |
| TPTA | 3.8 | 97.9 | 70.10 | 111.40 | 186.5 | 98.89 | 18.2:1 |
| NBTPTA | 13.8 | 92.3 | 5.80 | 195.90 | 230.1 | 122.00 | 0.42:1 |
| 4 WEEKS | | | | | | | |
| Urea | 180.5 | 0.0 | 0.0 | | 180.5 | 95.71 | — |
| DCD | 22.7 | 87.4 | 126.60 | | 149.3 | 79.16 | 5.7:1 |
| TPTA | 0.0 | 100.0 | 106.80 | 70.10 | 176.9 | 93.80 | 106:1 |
| NBTPTA | 24.2 | 86.6 | 5.90 | 186.30 | 216.4 | 114.74 | 0.24:1 |
| 5 WEEKS | | | | | | | |
| Urea | 184.7 | 0.0 | 0.60 | | 185.3 | 98.25 | — |
| DCD | 18.4 | 90.0 | 131.60 | | 150 | 79.53 | 7.2:1 |
| TPTA | 5.0 | 97.3 | 141.00 | | 146 | 77.41 | 28.2:1 |
| NBTPTA | 28.4 | 84.6 | 4.40 | 172.80 | 205.6 | 109.01 | 0.08:1 |

All containers had 384 g soil (dry), 887 mg (NH$_4$)$_2$SO$_4$ (188.0 mg N) and 41.0 mg inhibitor. Ten gram samples were extracted with 100 mls of 2N KCl. Formulas used for calculations are:

$$\% \text{ Inhibition} = \frac{C - S}{C} \times 100$$

C=Net $NO_3$-N produced in control (no inhibitor).
S=Net $NO_3$-N produced in inhibitor-treated sample.
Net $NO_3$-N=($NO_3$-N)-(Soil $NO_3$-N).

Values in table are averages of two replicate samples. No significant nitrite accumulations found at any of the sampling times.

Figure 4:
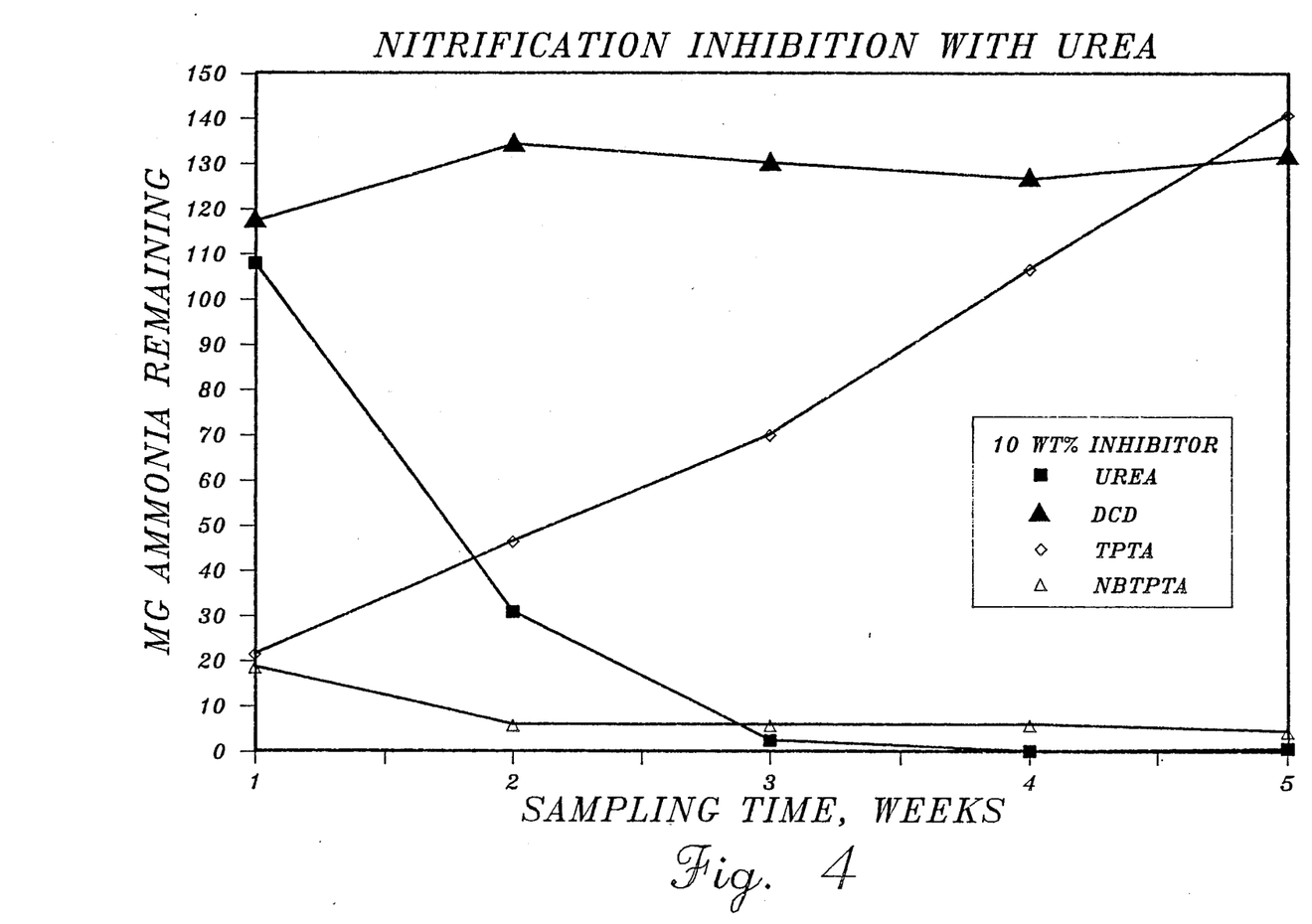
FIG. 4 is a line graph showing the milligrams of ammonium in the soil system for thiophosphoryl triamide (TPTA), dicyandiamide (DCD), and N-(n-Butyl)-thiophosphoryl triamide (NBTPTA) in a banded soil system at 25° C. with urea as the nitrogen source at each of the sampling times in this same test as FIG. 3, supra.

FIG. 4 is an indication that with TPTA, initial levels of ammonium are low, which will help in preventing seedling damage, while ammonium values rise throughout the 5-week period, providing continually increasing ammonium/nitrate ratios. NBTPTA, on the other hand, provides only urease inhibition and extends low levels of ammonia past the 5-week period. It therefore would not provide the proper level of ammonium during seedling growth.

Figure 5:
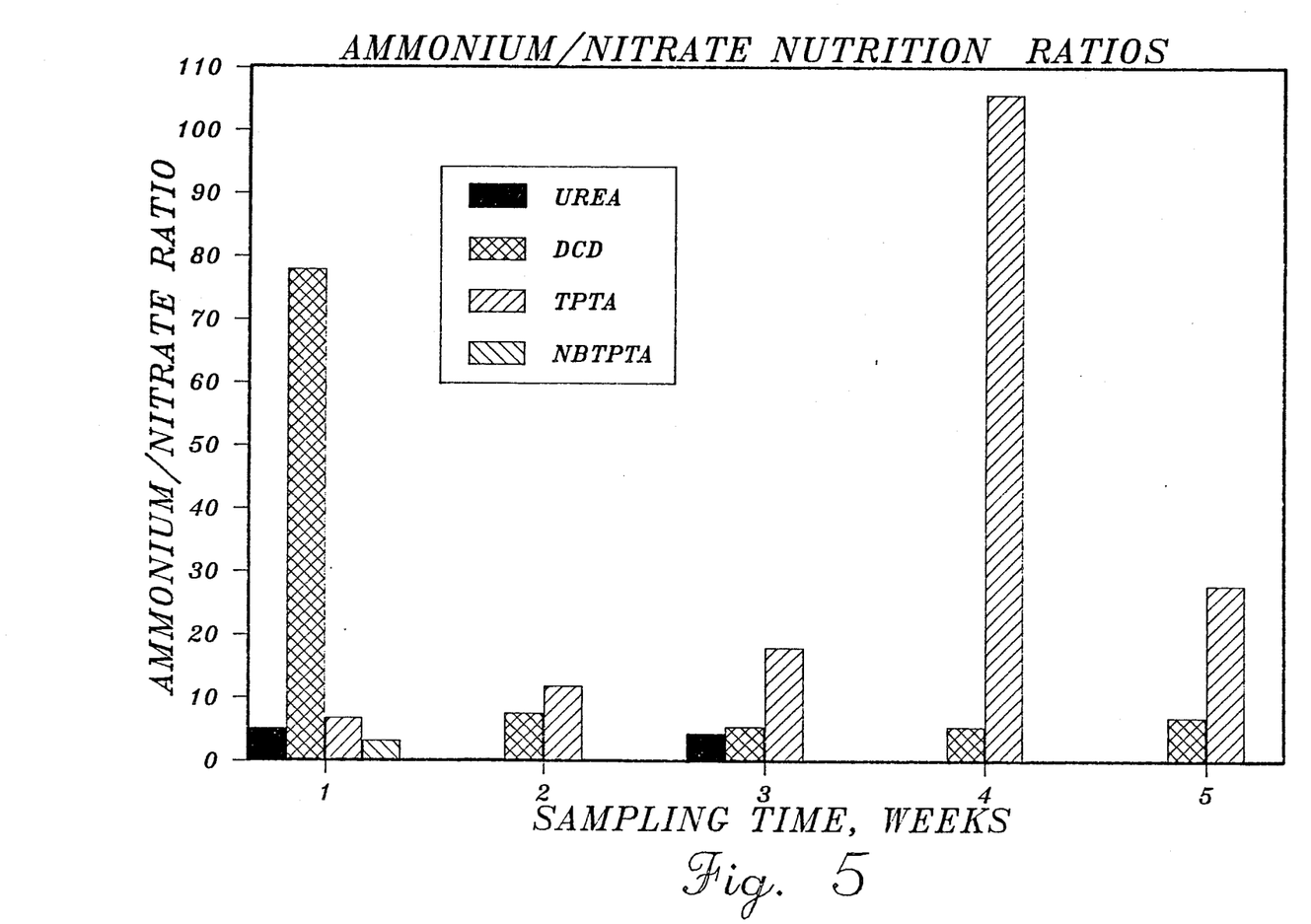

FIG. 5 confirms the fact that in addition to maintaining appropriate levels of ammonium during the 5-week period, the ammonium/nitrate ratio remained favorable. For example, with dicyandiamide, the ammonium/nitrate ratio was initially high (78:1) potentially resulting in seedling damage, reduced germination and lowered crop yields. The ratio then leveled off to a nearly constant 5:1 to 7:1. With TPTA, on the other hand, initial moderate ratio levels of 7:1 gradually increased and the maximum was reached at the 4-week level (106:1). In addition, it is obvious that one could vary the time of maximum ammonium/nitrate ratio by varying the amount of TPTA ammonium/nitrate nutrition control agent added to the soil.

INVENTION PARAMETERS

After sifting and winnowing through the data supra, as well as other results and operation of my new and novel invention for the use of thiophosphoryl triamide compounds to inhibit the nitrification of ammonium nitrogen in soil systems; I now present the principal operating parameters and variables for their use, it being understood that other variables, as considered and discussed supra may alone, or in various combinations be additional viable operational considerations and parameters.

Embodiment 1: For the use of thiophosphoryl triamide to inhibit the nitrification of ammonium nitrogen, the thiophosphoryl triamide concentration in the urea containing fertilizer can range from 0.01 to 20 weight percent of the ammonium nitrogen and/or urea nitrogen (expressed as total N) in the fertilizer, with 5 to 15 weight percent being the preferred concentration, and 5 to 10 weight percent being the most preferred concentration.

Embodiment 2: For the use of thiophosphoryl triamide as an ammonium/nitrate nutrition ratio control agent, the thiophosphoryl triamide concentration in the urea or ammonia containing fertilizer can range from 0.01 to 20 percent of the ammonium nitrogen and/or urea nitrogen (expressed as total N) in the fertilizer, with the preferred concentration being dependent on the particular needs of the specific crop during the reproduction, or as commonly referred to in the case of grain crops, during the grain-filling stage and with the concentration of control agent being high enough to maintain ammonium/nitrate ratios below 20:1 for the period of time from about 2 to perhaps as much as 6 to 10 weeks after planting, i.e., during the vegatative stage and below 15:1 for the first 10 days after planting, i.e., during the germination stage. The specific concentration of control agent necessary to cause this effect will be exemplified by an ammonium/nitrate ratio profile for the specific cropping system and will be dependent on crop type, soil urease activity, and soil nitrifying activity, as measured by standard tests.

For both Embodiment 1 and 2 the concentration of ammonium-N, and/or other fertilizers that hydrolyze to ammonium-N and/or urea-N in the fertilizer can range up to 83 weight percent N, it being understood; however, that urease inhibitors and nitrification inhibitors have most utility in fertilizers of high urea and ammonium nitrogen content (28–83 weight percent ammonium-N and/or urea-N).

Although urease and/or nitrification inhibitors are most useful in fertilizers with high urea and ammonium nitrogen content, which contain only nitrogen as a fertilizer component, the practice of fertilizer application and use often makes it desirable to mix or blend urea and/or ammonium containing nitrogen fertilizers with phosphorus and/or potassium containing fertilizers and/or micronutrients. For these applications the urea and/or ammonium fertilizers containing thiophosphoryl triamide can contain up to 25 weight percent $P_2O_5$ and/or 30 weight percent $K_2O$, and/or 5 weight percent micronutrients.

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the United States is:

1. A method for inhibiting the nitrification of ammonium nitrogen resulting from the inclusion of ammonia or ammonium-containing fertilizers to nitrite and nitrate at a situs, said situs including soil systems, which method comprises exposing soil containing nitrifying organisms at said situs to relatively small predetermined amounts of thiophosphoryl triamide, said method characterized by the fact that loss from said situs of fertilizer nitrogen values by leaching and denitrification therefrom and the resulting potential for groundwater pollution by said leaching and atmospheric pollution by said denitrification is eliminated or substantially reduced.

2. A method of continuously controlling, for a series of time intervals, the ammonium/nitrate nutrition ratio at a situs, said situs predisposed for specific crop cultivation and including soil systems containing urease enzymes and nitrifying organisms, which method comprises exposing said situs containing said urease enzymes and said nitrifying organisms to predetermined amounts of thiophosphoryl triamide sufficient to maintain an ammonium/nitrate ratio:
  (a) ranging between about 1:1 and 15:1 during at least a substantial portion of the germination stage of said specific crop;
  (b) ranging between about 10:1 to about 30:1 during at least a substantial portion of the vegatative stage of said specific crop; and
  (c) ranging between about 30:1 to about 100:1 during at least a substantial portion of the reproductive stage of said specific crop;
said method characterized by the fact said ammonium/nitrate nutrition ratio is optimized for the uptake of nitrogen by said specific crop and the production of maximum yields therefrom by predetermining the urease activity and nitrification activity of the soil system, the source of said nitrogen, and the particular ammonium/nitrate ratio profile required by said specific crop, at said situs to facilitate germination and reduce seedling damage and to ensure that said ratio peaks at its maximum during the period of highest demand required for maximum yield by said specific crop, and said method further characterized by the fact that loss from said situs of fertilizer nitrogen values by ammonia volatilization, leaching, and denitrification therefrom, and the resulting potential for groundwater pollution by said leaching and atmospheric pollution by said ammonia volatilization and said denitrification is eliminated or substantially reduced.

3. A method of continuously controlling, for a series of time intervals, the ammonium/nitrate nutrition ratio at a situs, said situs predisposed for specific grain crop cultivation and including soil systems containing urease enzymes and nitrifying organisms, which method comprises exposing said situs containing said urease enzymes and said nitrifying organisms to predetermined amounts of thiophosphoryl triamide sufficient to maintain an ammonium/nitrate ratio:
 (a) ranging between about 1:1 and 15:1 for at least a substantial amount of the period of time comprising said grain crop germination stage and ranging from about one week to about two weeks subsequent to said exposure;
 (b) ranging between about 10:1 to about 30:1 for at least a substantial amount of the period of time comprising said grain crop vegatative stage and commencing subsequent to about the termination of said germination period of time in (a) supra and continuning until about the initiation of the grain-filling stage of said grain crop; and
 (c) ranging between about 30:1 to about 100:1 for at least a portion of the period of time comprising said grain crop grain-filling stage and commencing subsequent to about the termination of said vegatative period of time in (b) supra;

said method characterized by the fact said ammonium/nitrate nutrition rate is optimized for the uptake of nitrogen by said specific grain crop and the production of maximum yields therefrom by predetermining the urease activity and nitrification activity of the soil system, the source of said nitrogen, and the particular ammonium/nitrate ratio profile required by said specific grain crop, at said situs to facilitate germination and reduce seedling damage and to ensure that said ratio peaks at its maximum during the period of highest demand required for maximum yield by said specific grain crop, and said method further characterized by the fact that loss from said situs of fertilizer nitrogen values by ammonia volatilization, leaching, and denitrification therefrom, and the resulting potential for groundwater pollution by said leaching and atmospheric pollution by said ammonia volatilization and said denitrification is eliminated or substantially reduced.

* * * * *